United States Patent
Uehara

(10) Patent No.: US 6,486,991 B1
(45) Date of Patent: Nov. 26, 2002

(54) OPTICAL TRANSMISSION SYSTEM HAVING AN OPTICAL SURGE SUPPRESSION FUNCTION

(75) Inventor: Daisuke Uehara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/149,014

(22) Filed: Sep. 8, 1998

(30) Foreign Application Priority Data

Sep. 8, 1997 (JP) .............................................. 9-242583

(51) Int. Cl.[7] .............................................. H04B 10/00
(52) U.S. Cl. ........................................ 359/160; 359/119
(58) Field of Search ................... 359/124, 119, 359/160, 176

(56) References Cited

U.S. PATENT DOCUMENTS

| | | | | |
|---|---|---|---|---|
| 5,892,616 A | * | 4/1999 | Takahashi | 359/341.43 |
| 5,986,783 A | * | 11/1999 | Sharma | 359/119 |
| 6,064,514 A | * | 5/2000 | Aoki et al. | 359/341 |

FOREIGN PATENT DOCUMENTS

JP 06152034 A * 5/1994 .................. 372/20

* cited by examiner

*Primary Examiner*—Jason Chan
*Assistant Examiner*—Christina Y Leung
(74) *Attorney, Agent, or Firm*—McGinn & Gibb, PLLC

(57) ABSTRACT

An optical transmission system having an optical surge suppression function, includes optical amplifiers for amplifying input signal light directly, and a dummy light output unit for inputting dummy light different from the signal light into the optical amplifiers. The optical amplifiers each include a rare each element doped optical fiber for amplifying input signal light to output the amplified signal light, a pumping light source for outputting pumping light, a first optical wavelength multiplexer for inputting the pumping light to the rare earth element doped optical fiber, an optical branching device for branching part of the amplified signal light to output the branched signal light, and a pumping light control unit for controlling the output of the pumping light based on the output level of the branched light.

20 Claims, 6 Drawing Sheets

OPTICAL TRANSMISSION SYSTEM HAVING AN OPTICAL SURGE SUPPRESSION FUNCTION

BACKGROUND OF THE INVENTION

1. Field of the Invention

The present invention relates to an optical transmission system and, more particularly, to an optical transmission system having an optical surge suppression function.

2. Description of the Related Art

For medium and long-range optical transmission, an optical amplifier for optically amplifying signal light directly is arranged on a transmission line. As the optical amplifier is widely used an optical fiber amplifier for optically amplifying signal light with an amplifying optical fiber containing a rare earth element.

The amplifying optical fiber containing a rare earth element is connected to a transmission line to receive signal light input thereinto. Pumping light output from a pumping light source is input into the amplifying optical fiber through an optical wavelength division multiplexer (WDM).

Part of the signal light amplified by the amplifying optical fiber is branched by an optical branching device. The branched light is received by a detector to detect the output level of the light. The output of the pumping light is feed-back controlled by the control of an injection current into the pumping light source by a pumping light control circuit in accordance with the detected output level of the light.

The optical amplifier is used in an optical transmission system having operable transmission lines and auxiliary transmission lines, for example, an optical add drop multiplexer ring system (OADM ring system) to which a wavelength multiplex optical transmission is applied, and an optical cross connect transmission system. The optical ADM ring system has auxiliary transmission lines in addition to operable transmission lines in order to ensure the reliability of the optical transmission system. When a failure occurs in part of the system or a transmission line, an optical switch arranged at a node is used to switch between a operable transmission line and an auxiliary transmission line.

In the optical ADM ring transmission system and the optical cross connect transmission system, at the time of switching between the operable transmission line and the auxiliary transmission line at each node, signal light is suddenly input into the optical amplifier arranged on the switched transmission line from an optical input break state.

This sudden input of the signal light may occur also when the transmission path is switched in the optical cross connect transmission system.

When the signal light is suddenly input, the feed-back control of the optical amplifier for the adjustment of the output level of light from the pumping light source cannot follow the sudden rise with the result that the optical amplifier generates an optical surge as an output. The optical surge causes a failure in an optical receiving unit of a node for receiving because the optical surge is further increased by multi-stage linear relay. A definite countermeasure against this optical surge is not taken at the moment.

SUMMARY OF THE INVENTION

It is an object of the present invention to prevent an optical surge in an optical direct amplifier arranged on a switched transmission line at the time of switching between operable/auxiliary transmission lines at each node or switching the transmission path in an optical ADM ring transmission system or optical cross connect transmission system.

The optical transmission system having an optical surge suppression function of the present invention comprises a dummy light source for inputting dummy light different from signal light into an optical amplifier in addition to optical amplifiers for optically amplifying input signal light directly. The optical amplifier in the above optical transmission system comprises a rare earth element doped optical fiber for amplifying input signal light to output the amplified signal light, a pumping light source for outputting pumping light, a first optical wavelength multiplexer for inputting the pumping light into the rare earth element doped optical fiber, an optical branching device for branching part of the amplified signal light to output the branched signal light, and a pumping light control unit for controlling the output of pumping light based on the output level of the branched light.

The dummy light source comprises a dummy light output source for outputting dummy light and a second optical wavelength multiplexer for inputting the dummy light into the rare earth element doped optical fiber.

Further, in the optical transmission system having an optical surge suppression function of the present invention, the dummy light contains a self-oscillating clock. The dummy light output source comprises a signal light identifying unit for identifying whether the input light is dummy light or not and a clock control circuit for including a self-oscillating clock in the dummy light output from the dummy light source when the input light is dummy light and not including the self-oscillating clock in the dummy light output from the dummy light source when the input light is not dummy light.

The optical transmission system having an optical surge suppression function of the present invention comprises optical transmission lines including operable transmission lines and auxiliary transmission lines, ADM nodes, a regenerative repeating node and optical amplifiers, arranged on the operable transmission lines and the auxiliary transmission lines, for optically amplifying signal light. Each of the ADM nodes comprises an optical depultiplexing/inserting unit for separating specific signal light from signal light transmitted through the operable transmission lines or the auxiliary transmission lines and inserting the specific signal light and a transmission line switching unit for switching between the operable transmission lines and the auxiliary transmission lines. The regenerative repeating node comprises optical receiving units for receiving signal light transmitted through the operable transmission lines or the auxiliary transmission lines and optical transmitting units for transmitting signal light by regenerative repeating. In the optical transmission system of the present invention, the regenerative repeating unit further comprises a dummy light output unit for transmitting dummy light to the optical transmitting units.

The above regenerative repeating unit of the optical transmission system of the present invention transmits a transmission line clock to an optical transmitting unit connected to a transmission line in operation out of the operable transmission lines and the auxiliary transmission lines. On the other hand, the regenerative repeating unit further comprises the self-oscillating clock sources for synchronizing an optical transmitting unit connected to a transmission line out of operation with a self-oscillating clock to transmit light.

The regenerative repeating node comprises an input break identifying unit and a clock control unit. The input break identifying unit identifies an input break of signal light input from the operable transmission lines and the auxiliary transmission lines. The clock control unit controls the switching of a clock so that input light is synchronized with a transmission line clock extracted from main signal light when it identifies that the input light is main signal light and with a self-oscillating clock source when it identifies that the input light is dummy light.

The optical transmission system having an optical surge suppression function of the present invention is an optical transmission system having the above optical surge suppression function and comprises optical transmission lines including two or more operable transmission lines and auxiliary transmission lines and a center node for transmitting a plurality of signal light having different wavelengths to the respective operable transmission lines or auxiliary transmission lines and receiving signal light from the respective operable transmission lines or auxiliary transmission lines.

The optical demultiplexing/inserting unit comprises a wavelength demultiplexinq unit for extracting and demultiplexing signal light having an arbitral wavelength and a wavelength multiplexing unit for multiplexing the wavelength of signal light transmitted from the ADM node. The dummy light output unit of the present invention outputs the dummy light as a false signal or a continuous light having a wavelength different from the wavelength of the transmission line.

The optical transmission system having an optical surge suppression function of the present invention can be constituted such that a center node, ADM nodes and a regenerative repeating node are interconnected by optical transmission lines in the configuration of a ring. As a result, the present invention can be applied to an optical ADM ring optical transmission system.

Meanwhile, the optical transmission system having an optical surge suppression function of the present invention can be applied to an optical cross connect system that will be described hereinafter as another embodiment of the present invention. This optical transmission system comprises WDM terminal equipment, a plurality of nodes and optical amplifiers arranged between the respective nodes. The WDM terminal equipment includes optical transmitting units for transmitting a plurality of signal light having different wavelengths and optical receiving units for receiving a plurality of signal light having different wavelengths. The plurality of nodes are connected to the WDM terminal equipment through a plurality of transmission lines and switch the path of signal light having a arbitrary wavelength out of the wavelengths of signal light input from the input ports. Each node comprises a dummy light output unit for outputting the dummy light to transmit the dummy light to a transmission line.

The node comprises a wavelength demultiplexing unit for demultiplexing signal light having a specific wavelength out of the wavelengths of input signal light and a regenerative repeating unit for carrying out the regenerative repeating of the signal light demultiplexed by the wavelength demultiplexing unit.

The dummy light is transmitted to a transmission line between unused nodes at the regenerative repeating unit connected to an unused input port.

The dummy light output unit outputs dummy light as a false signal or a continuous light having a wavelength different from the wavelength of the transmission line clock. In the optical ADM ring optical transmission system, light is always transmitted to the operable/auxiliary transmission lines by causing an optical transmitting unit connected to a transmission line out of operation to carry out transmission in synchronism with a self-oscillating clock. Therefore, it is possible to suppress the occurrence of an optical surge without a break of input into an optical direct amplifier arranged on a path between adjacent nodes.

In the optical cross connect system, dummy light is transmitted to a path between unused nodes in synchronism with a self-oscillating clock of the regenerative repeating unit of each node, thereby making it possible to suppress the occurrence of an optical surge without a break of input into an optical direct amplifier arranged on a path between adjacent nodes.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

Before describing an optical transmission system having an optical surge suppression function according to an preferred embodiment of the present invention, the configuration of a conventional optical transmission system, particularly the configuration of an amplifier will be first described to make the present invention understandable.

Figure 1:
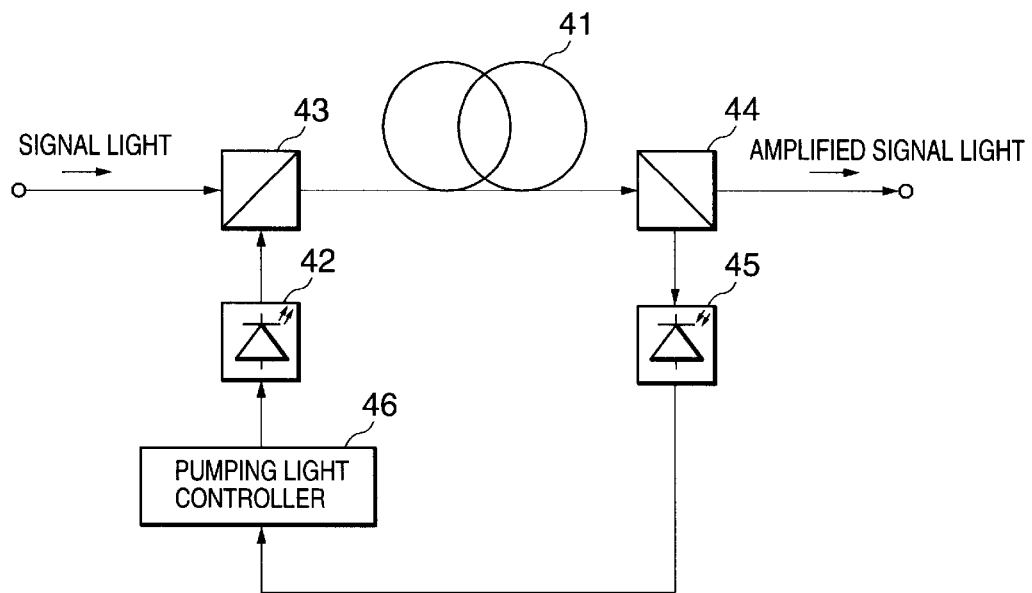
FIG. 1 is a block diagram showing the configuration of a conventional optical amplifier.

For medium- and long-range optical transmission, an optical amplifier for amplifying optical signal directly is arranged on a transmission line. FIG. 1 shows a block diagram of an example of the optical amplifier.

An amplifying optical fiber 41 containing a rare earth element is connected to a transmission line to receive optical signal input therein. Pumping light output from a pumping light source 42 is input into the amplifying optical fiber 41 through an optical wavelength multiplexer 43.

The optical signal amplified by the amplifying optical fiber 41 is output to a right part of the figure. Part of the amplified optical signal is branched by an optical branching device 44. The branched light is received by a detector 45 to detect the output level of the light. The output of the pumping light is feed-back controlled by the control of an injection current to the pumping light source by a pumping light control circuit in accordance with the detected output level of the light.

The optical amplifier is used in an optical transmission system having operable transmission lines and auxiliary transmission lines, such as an optical ADM ring system to which wavelength multiplex optical transmission is applied or an optical cross connect transmission system. The optical ADM ring system comprises auxiliary transmission lines in addition to operable transmission lines so as to ensure the reliability of the optical transmission system. When a failure occurs in part of the system or a transmission line, an optical switch arranged at a node is used to switch between an operable transmission line and an auxiliary transmission line.

Description is subsequently given of an optical amplifier having an optical surge suppression function of the present invention.

Figure 2:
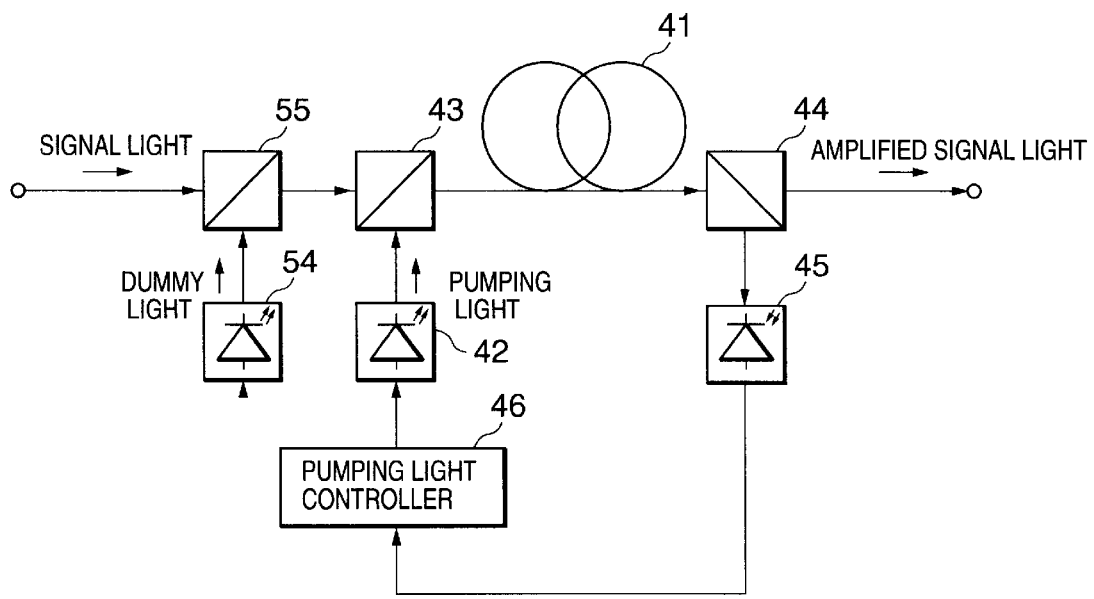
FIG. 2 is a block diagram showing an optical transmission system having an optical surge suppression function of the present invention in accordance with a first embodiment of the present invention.

FIG. 2 is a block diagram showing the configuration of an optical transmission system having an optical surge suppression function of the present invention in accordance with a first embodiment of the present invention.

The optical transmission system according to the first embodiment comprises a dummy light source 54 for generating dummy light and an optical coupler 55 for coupling the dummy light with main signal light. Since the dummy light is input into the amplifying optical fiber 41 even when there is no input of signal light, the occurrence of an optical surge can be prevented even when light is suddenly input into the amplifying optical fiber 41 by the switching of an optical path.

Figure 3:
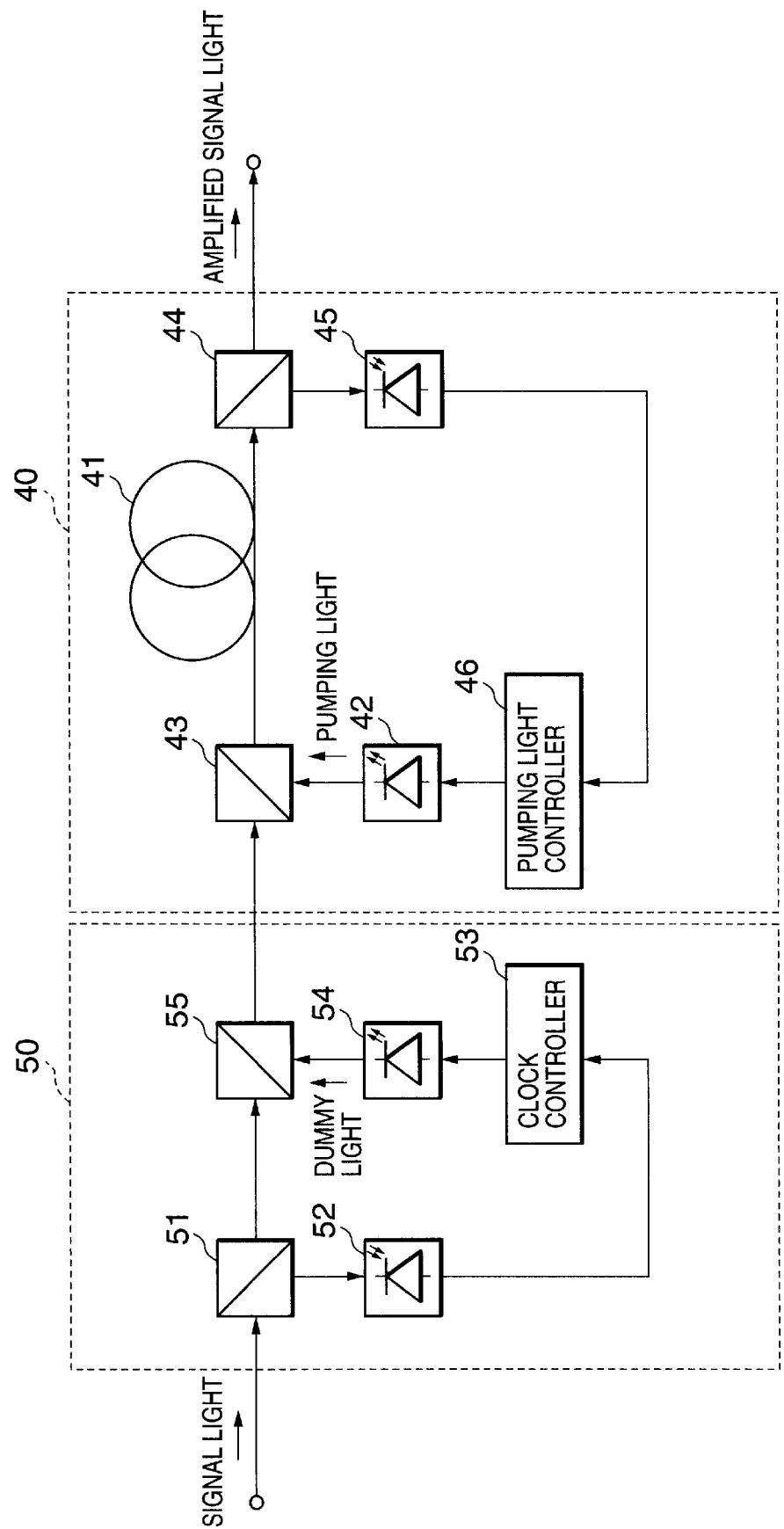
FIG. 3 is a block diagram showing the configuration of an embodiment in which in the optical transmission system having the optical surge suppression function of the present invention in accordance with the first embodiment, a clock control circuit for generating a self-oscillating clock is provided.

FIG. 3 is a block diagram showing the configuration of an embodiment in which in the optical transmission system having the optical surge suppression function of the present invention in accordance with the first embodiment, (a clock control circuit for generating a self-oscillating clock is provided.

Part of the signal light is branched by an optical branching device 51 and the branched light is input into a detector 52. The detector 52 converts the input light into an electric signal to detect the presence or absence of the signal light. When there is no input of signal light, the clock control circuit 53 having a self-oscillating clock source transmits a self-oscillating clock to the dummy light source 54. The dummy light source 54 generates dummy light including the self-oscillating clock. The dummy light including the self-oscillating clock is input into the amplifying optical fiber 41 through the optical coupler 55.

Description is subsequently given of a second embodiment in which the optical transmission system having an optical surge suppression function of the present invention is applied to an ADM system.

Figure 4:
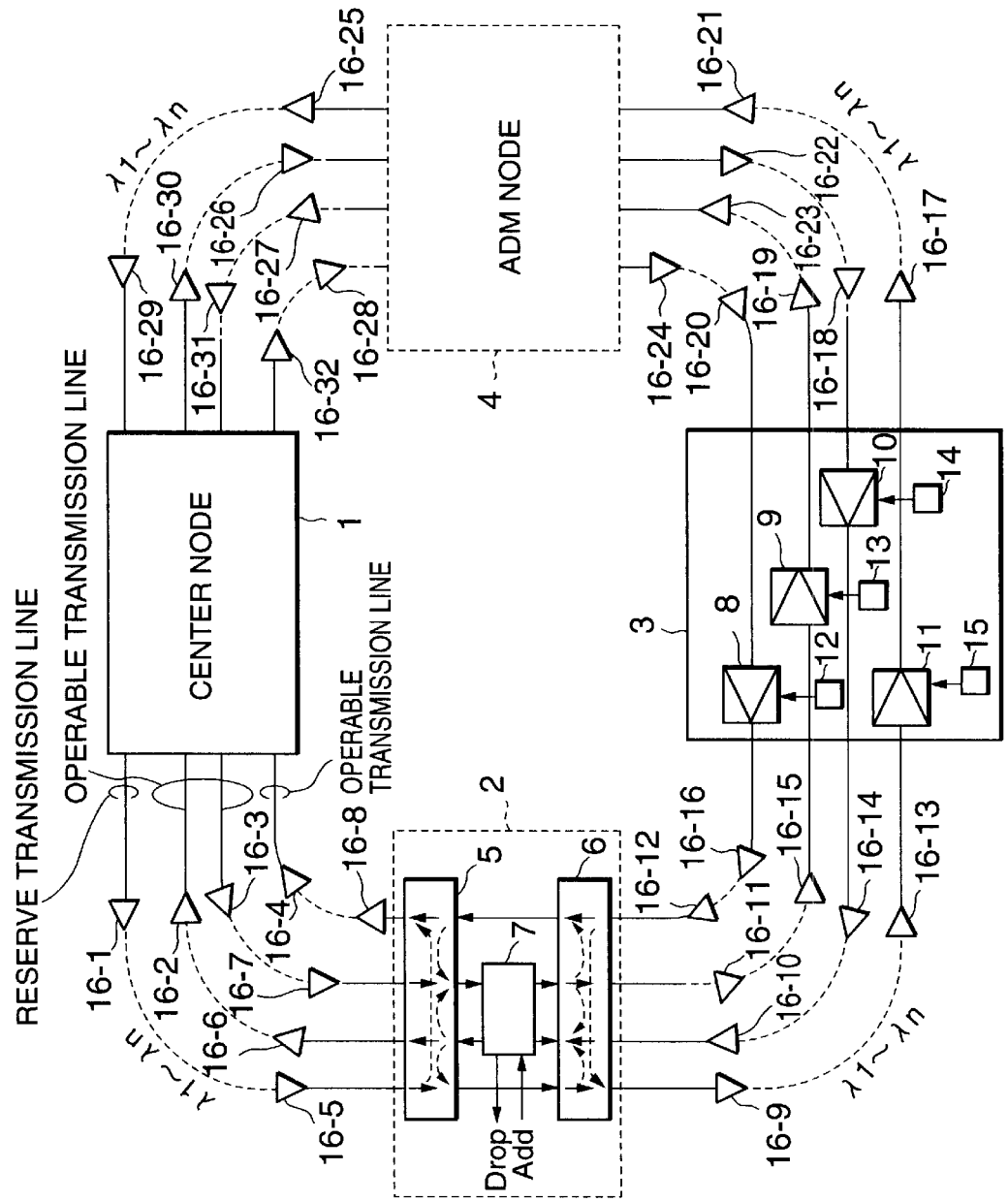
FIG. 4 is a block diagram showing an optical transmission system having an optical surge suppression function of the present invention in accordance with a second embodiment of the present invention.

FIG. 4 is a block diagram showing an optical transmission system having an optical surge suppression function of the present invention in accordance with the second embodiment of the present invention. The optical transmission system shown in FIG. 4 is an example which is applied to the ADM system of a wavelength multiplex optical transmission system.

The ADM system is constituted by a center node 1, ADM nodes 2, 4, a regenerative repeating node 3, transmission lines connecting therebetween in the configuration of a ring, and optical amplifiers 16-1 to 16-30 arranged on the transmission lines. The transmission lines are made up of two inner operable/auxiliary transmission lines and two outer operable/auxiliary transmission lines. The number of optical amplifiers arranged on the transmission lines is increased or decreased according to the distances of the transmission lines between nodes. To make an explanation more understandable, there are two ADM nodes and one regenerative repeating node in this embodiment but these numbers may be increased as required.

WDM signal light output from the center node 1 transmits through ADM nodes 2, 4 and a WDM regenerative repeating node 3. The WDM regenerative repeating node includes WDM regenerative repeating units 8 to 11.

Each of the ADM nodes 2, 4 is comprised of optical switches 5, 6 for switching between a WDM regenerative repeating operable transmission line and an auxiliary transmission line and an optical demultiplexing/inserting unit 7 for demultiplexing/inserting an arbitrary wavelength element (channel).

In the optical transmission system of this embodiment, a ring-configuration network is formed so that signal light is input into the center node 1 through the ADM nodes 2, 4 and the WDM regenerative repeating node 3 having the WDM regenerative repeating units 8 to 11 and clock sources 12 to 15 for generating dummy light. Optical direct amplifiers 16 are arranged on transmission lines between the respective nodes according to the distance between the nodes.

The ADM nodes 2, 4 usually carries out transmission using operable transmission lines. When a failure occurs in the transmission line between nodes, the optical switches 5, 6 are used to switch to an auxiliary transmission line for the recovery of the transmission line. In the WDM regenerative repeating node 3, regenerative repeating is carried out in synchronism with transmission line clocks by the WDM regenerative repeating units 9, 10 connected to the operable transmission lines during normal operation. Dummy light is output to the WDM regenerative repeating units 8, 11 connected to the auxiliary transmission lines by the self-oscillating clock sources 12, 15.

When the transmission lines are switched by the optical ADM nodes 2, 4, the WDM regenerative repeating units 8, 11 switch from the self-oscillating clocks to the transmission line clocks to carry out regenerative repeating. At the same time, dummy light is output to the WDM regenerative repeating units 9, 10 by switching from the transmission line clocks to the self-oscillating clock sources 13, 14.

With the above arrangement, light always propagates through both of the operable/auxiliary transmission lines in the configuration of a ring. Accordingly, the light is always input into the optical direct amplifiers 16 arranged between the respective nodes. As a result, even when the operable transmission lines are switched to the auxiliary transmission lines or vice verse, the sudden input of light does not occur, thereby making it possible to suppress the occurrence of an optical surge in the optical amplifiers.

Figure 5:
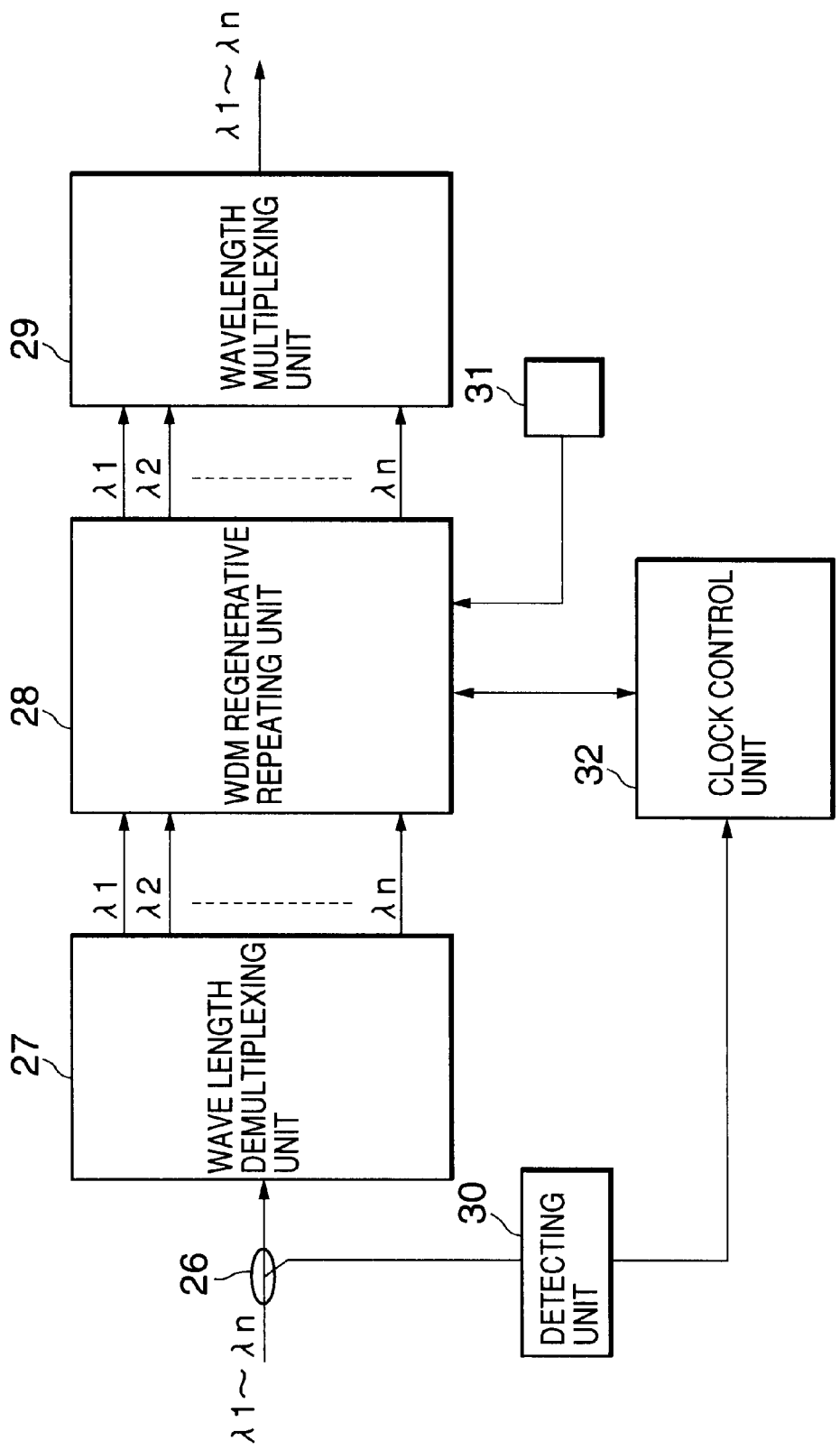
FIG. 5 is a block diagram showing the configuration of a WDM regenerative repeating unit used in the optical transmission system having the optical surge suppression function of the present invention in accordance with the second embodiment of the present invention.

FIG. 5 is a block diagram showing the details of the WDM regenerative repeating units 8 to 11. The WDM regenerative repeating unit comprises an optical branching device 26, a detector 30, a clock control unit 32, a wavelength demultiplexing unit 27, a regenerative repeating unit 28 and a wavelength multiplexing unit 29.

The optical branching unit 26 branches and inputs the WDM signal light input from an operable or auxiliary transmission line into the wavelength demultiplexing unit 27 and the detecting unit 30. The detecting unit 30 converts the signal light input via the optical branching unit 26 into an electric signal to monitor and identify a break of light input. The clock control unit 32 terminates a signal indicative of judgment on the break of light input from the detecting unit 30 and a/section over head (SOH) signal from the WDM regenerative repeating unit 28.

Thereafter, when it is identified as main signal light from the result of the termination of a bite for judging whether the input is main signal light or dummy light contained in the SOH signal, it is synchronized with a transmission line clock extracted from the main signal light. On the other hand, when the input light is identified as dummy light, clock switch control is carried out to synchronize with the self-oscillating clock source 31.

The wavelength demultiplexing unit 27 carries out the wavelength demultiplex of the WDM signal light. The regenerative repeating unit 28 carries out the regenerative repeating of signal light from the wavelength demultiplexing unit 27. The signal light from the regenerative repeating unit 28 is multiplexed by the wavelength multiplexing unit 29. Dummy light transmitted from the dummy light generating unit 31 may be output as a dummy light or a continuous light having a frequency different from that of the transmission line clock.

Description is subsequently given of a third embodiment in which the optical transmission system having an optical surge suppression function of the present invention is applied to an optical cross connect system.

Figure 6:
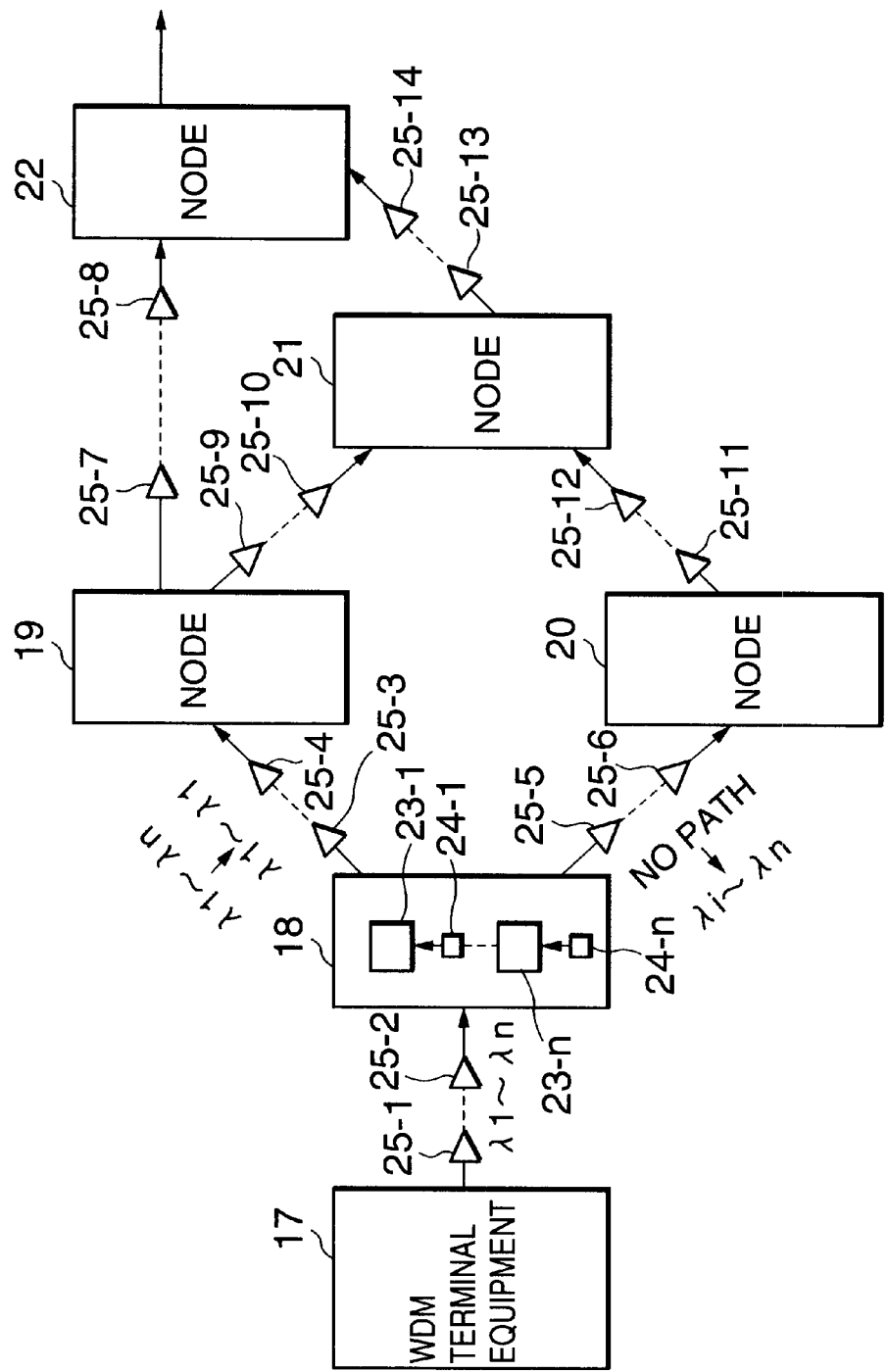
FIG. 6 is a block diagram showing an optical transmission system having an optical surge suppression function of the present invention in accordance with a third embodiment of the present invention.
Figure 7:
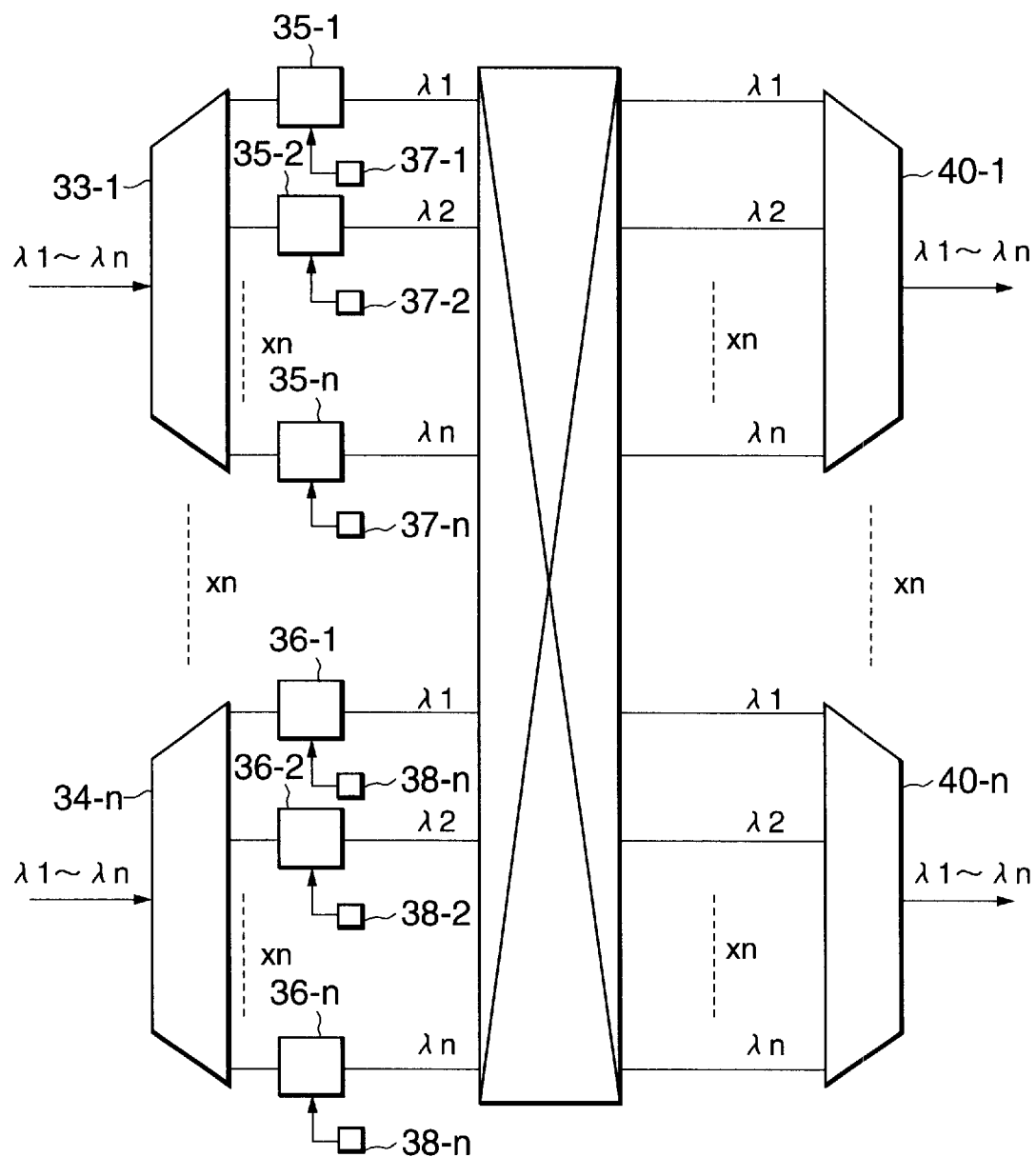
FIG. 7 is a block diagram showing the configuration of nodes used in the optical transmission system having the optical surge suppression function of the present invention in accordance with the third embodiment of the present invention.

FIG. 6 is a block diagram showing the third embodiment of the present invention in the optical cross connect system of a wavelength multiplex optical transmission system. FIG. 7 is a block diagram showing the configuration of nodes used in the optical transmission system having an optical surge suppression function of the present invention according to the third embodiment of the present invention.

A plurality of nodes 18 to 22 are arranged between two WDM terminal equipments (in this figure, only one WDM terminal equipment 17 is shown). The respective nodes are interconnected by transmission lines. FIG. 6 shows an example of the connections therebetween. Optical amplifiers 25-1 to 25-14 are arranged between the WDM terminal equipment 17 and the node 18 and between the respective nodes on the basis of the distance therebetween.

WDM signal light output from the WDM terminal equipment 17 is input into the node 18. The node 18 has self-oscillating clock sources 24 for generating dummy light at the WDM regenerative repeating units 23 arranged for respective wavelength elements (channels). The WDM signal light is transmitted to a transmission line through other nodes 19 to 22 arranged in the configuration of a mesh. Optical direct amplifiers 25 are arranged on transmission lines between the respective nodes for long-range repeating transmission.

FIG. 7 is a detailed block diagram of the nodes 18 to 22.

Each of the nodes 18 to 22 comprises wavelength demultiplexing units 33, 34, regenerative repeating units 35, 36, self-oscillating clock sources 37, 38, an optical switch 39 and wavelength multiplexing units 40. The wavelength demultiplexing units 33, 34 carry out the wavelength demultiplex of the input WDM signal light. The regenerative repeating units 35, 36 carry out the regenerative repeating of respective wavelength elements (channels) from the wavelength demultiplexing units 33, 34, respectively. The self-oscillating clock sources 37, 38 generate dummy light. The optical switch 39 changes the destinations of respective signal lights output from the self oscillating clock sources 37, 38 and the regenerative repeating units 35, 36. The signal light output from the optical switch 39 is wavelength multiplexed and output by the wavelength multiplexing unit 40.

The nodes used in this embodiment can receive "n" numbers of WDM signal light and output channels demultiplexed from each WDM signal light via the "n" numbers of arbitrary output ports. The regenerative repeating units 35, 36 connected to unused input ports out of the "n" numbers of input ports can generate dummy light in response to the self-oscillating clock sources 37, 38, respectively.

The node 18 shown in FIG. 6 has one input port from the WDM terminal equipment 17 and two output ports to the node 19 and the node 20. When all the channels ($\lambda 1$ to $\lambda n$) from the WDM terminal equipment 17 are transmitted to the node 19, there is no path to the node 20. When the output of the node 18 to the node 19 is switched to $\lambda 1$ to $\lambda n$ and the output of the node 18 to the node 20 is switched to $\lambda j$ to $\lambda n$, light is suddenly input into the optical direct amplifier 25-5.

In the optical transmission system of the present invention, when there is no path between the node 18 and the node 19, the unused regenerative repeating unit 23 is synchronized by the self-oscillating clock source 24 to transmit dummy light, thereby making it possible to suppress an optical surge in the optical direct amplifier 27-5 caused by the sudden establishment of a path.

The unused regenerative repeating unit 23 may output as the dummy light generating unit the dummy light or continuous light having a frequency different from that of the transmission line clock.

In the WDM regenerative repeating unit arranged in the ring, an optical transmitting unit connected to a transmission line under operation transmits signal light in synchronism with the transmission line clock. An optical transmitting unit connected to a transmission line out of operation transmits signal light in synchronism with the self-oscillating clock. Withe the above arrangement, light is always transmitted to both systems, thereby making it possible to suppress the optical surge output of the optical direct amplifier at the time of switching the transmission line.

In the optical cross connect system, the unused regenerative repeating unit of each node is synchronized with the self-oscillating clock source to transmit dummy light to a path between unused nodes like the above optical ADM ring system, thereby making it possible to suppress an optical surge in the optical direct amplifier caused by the sudden establishment of a path.

While the present invention has been described in connection with certain preferred embodiments, it is to be understood that the subject matter encompassed by way of this invention is not to be limited to those specific embodiments. On the contrary, it is intended for the subject matter of the present invention to include all alternatives, modifications and equivalents as can be included within the spirit and scope of the following claims.

What is claimed is:

1. An optical transmission system having an optical surge suppression function, comprising:
   optical amplifiers for amplifying input signal light directly; and
   dummy light output means for inputting dummy light different from the signal light into said optical amplifiers, wherein each of said optical amplifiers comprises:
- a rare earth element doped optical fiber for amplifying input signal light to output the amplified signal light;
- a pumping light source for outputting pumping light;
- a first optical wavelength multiplexer for inputting the pumping light to said rare earth element doped optical fiber;
- an optical branching device for branching part of the amplified signal light to output the branched signal light; and
- pumping light control means for controlling the output of the pumping light based on the output level of the branched light, wherein said dummy light output means comprises:
  - a dummy light output source for outputting dummy light; and
  - a second optical wavelength multiplexer for inputting the dummy light into said rare earth element doped optical fiber,
- wherein the dummy light signal includes a self-oscillating clock.

2. An optical transmission system having an optical surge suppression function according to claim 1, further comprising:
- optical transmission lines including operable transmission lines and auxiliary transmission lines;
- add/drop multiplexer (ADM) nodes, each comprising transmission line switching means for switching an optical path between the operable transmission lines and the auxiliary transmission lines and an optical demultiplexing/inserting means for separating specific signal light from signal light transmitted through the operable transmission lines or the auxiliary transmission lines and inserting the specific signal light;
- a regenerative repeating node comprising optical receiving units for receiving signal light transmitted through the operable transmission lines or the auxiliary transmission lines and optical transmitting units for transmitting the signal light by regenerative repeating; and
- optical amplifiers, arranged on both the operable transmission lines and the auxiliary transmission lines, for amplifying the signal light,
- wherein each of said optical transmitting units comprises dummy light output means, for outputting dummy light.

3. The optical transmission system according to claim 2, wherein said optical transmission system having an optical surge suppression function further comprises:
- a center node for transmitting a plurality of signal light having different wavelengths to the operable transmission lines or the auxiliary transmission lines and receiving signal light from the operable transmission lines or the auxiliary transmission lines, and
- said optical demultiplexing/inserting means comprises:
  - a wavelength demultiplexing unit for extracting and demultiplexing signal light having a desired wavelength out of the wavelengths; and
  - a wavelength multiplexing unit for multiplexing the wavelength of signal light transmitted from said ADM node.

4. An optical transmission system having an optical surge suppression function according to claim 3, wherein said center node, said ADM nodes and said regenerative repeating node are interconnected by said transmission lines in the configuration of a ring.

5. An optical transmission system having an optical surge suppression function according to claim 3, wherein said dummy light output means outputs the dummy light as a false signal having a frequency different from the frequency of the transmission line clock.

6. An optical transmission system having an optical surge suppression function according to claim 3, wherein said dummy light output means outputs the dummy light as a continuous light.

7. An optical transmission system having an optical surge suppression function, comprising:
- optical amplifiers for amplifying input signal light directly; and
- dummy light output means for inputting dummy light different from the signal light into said optical amplifiers,
- wherein each of said optical amplifiers comprises:
  - a rare earth element doped optical fiber for amplifying input signal light to output the amplified signal light;
  - a pumping light source for outputting pumping light;
  - a first optical wavelength multiplexer for inputting the pumping light to said rare earth element doped optical fiber;
  - an optical branching device for branching part of the amplified signal light to output the branched signal light; and
  - pumping light control means for controlling the output of the pumping light based on the output level of the branched light,
- wherein said dummy light output means comprises:
  - a dummy light output source for outputting dummy light;
  - a second optical wavelength multiplexer for inputting the dummy light into said rare earth element doped optical fiber;
  - input light identifying means for identifying whether the input light comprises dummy light or not; and
  - clock control means for including a self-oscillating clock in dummy light output from said dummy light output means when the input light comprises dummy light and for not including a self-oscillating clock in dummy light output from said dummy light output means when the input light does not comprise dummy light.

8. An optical transmission system having an optical surge suppression function according to claim 7, further comprising:
- optical transmission lines including operable transmission lines and auxiliary transmission lines;
- add/drop multiplexer (ADM) nodes, each comprising transmission line switching means for switching an optical path between the operable transmission lines and the auxiliary transmission lines and an optical demultiplexing/inserting means for separating specific signal light from signal light transmitted through the operable transmission lines or the auxiliary transmission lines and inserting the specific signal light;
- a regenerative repeating node comprising optical receiving units for receiving signal light transmitted through the operable transmission lines or the auxiliary transmission lines and optical transmitting units for transmitting the signal light by regenerative repeating; and
- optical amplifiers, arranged on both the operable transmission lines and the auxiliary transmission lines, for amplifying the signal light,
- wherein each of said optical transmitting units comprises dummy light output means, for outputting dummy light.

9. The optical transmission system according to claim 8, wherein said optical transmission system having an optical surge suppression function further comprises:
- a center node for transmitting a plurality of signal light having different wavelengths to the operable transmission lines or the auxiliary transmission lines and receiving signal light from the operable transmission lines or the auxiliary transmission lines, and
- said optical demultiplexing/inserting means comprises:
  - a wavelength demultiplexing unit for extracting and demultiplexing signal light having a desired wavelength out of the wavelengths; and
  - a wavelength multiplexing unit for multiplexing the wavelength of signal light transmitted from said ADM node.

10. An optical transmission system having an optical surge suppression function according to claim 8, wherein said center node, said ADM nodes and said regenerative repeating node are interconnected by said transmission lines in the configuration of a ring.

11. An optical transmission system having an optical surge suppression function, comprising:
- optical transmission lines including operable transmission lines and auxiliary transmission lines;
- add/drop multiplexer (ADM) nodes, each comprising transmission line switching means for switching an optical path between the operable transmission lines and the auxiliary transmission lines and an optical demultiplexing/inserting means for separating specific signal light from signal light transmitted through the operable transmission lines or the auxiliary transmission lines and inserting the specific signal light;
- a regenerative repeating node comprising optical receiving units for receiving signal light transmitted through the operable transmission lines or the auxiliary transmission lines and optical transmitting units for transmitting the signal light by regenerative repeating; and
- optical amplifiers, arranged on both the operable transmission lines and the auxiliary transmission lines, for amplifying the signal light,
- wherein each of said optical transmitting units comprises dummy light output means for outputting dummy light, and
- wherein said regenerative repeating node comprises self-oscillating clock sources for transmitting a transmission line clock to an optical transmitting unit connected to a transmission line in operation out of the operable transmission lines or the auxiliary transmission lines, and for transmitting dummy light to an optical transmitting unit connected to a transmission line out of operation in synchronism with a self-oscillating clock out of the operable transmission lines or the auxiliary transmission lines.

12. The optical transmission system according to claim 11, wherein said optical transmission system having an optical surge suppression function further comprises:
- a center node for transmitting a plurality of signal light having different wavelengths to the operable transmission lines or the auxiliary transmission lines and receiving signal light from the operable transmission lines or the auxiliary transmission lines, and
- said optical demultiplexing/inserting means comprises:
  - a wavelength demultiplexing unit for extracting and demultiplexing signal light having a desired wavelength out of the wavelengths; and
  - a wavelength multiplexing unit for multiplexing the wavelength of signal light transmitted from said ADM node.

13. An optical transmission system having an optical surge suppression function according to claim 12, wherein said center node, said ADM nodes and said regenerative repeating node are interconnected by said transmission lines in the configuration of a ring.

14. An optical transmission system having an optical surge suppression function according to claim 12, wherein said dummy light output means outputs the dummy light as a false signal having a frequency different from the frequency of the transmission line clock.

15. An optical transmission system having an optical surge suppression function according to claim 12, wherein said dummy light output means outputs the dummy light as a continuous light.

16. An optical transmission system having an optical surge suppression function, comprising:
- optical transmission lines including operable transmission lines and auxiliary transmission lines;
- add/drop multiplexer (ADM) nodes, each comprising transmission line switching means for switching an optical path between the operable transmission lines and the auxiliary transmission lines and an optical demultiplexing/inserting means for separating specific signal light from signal light transmitted through the operable transmission lines or the auxiliary transmission lines and inserting the specific signal light;
- a regenerative repeating node comprising optical receiving units for receiving signal light transmitted through the operable transmission lines or the auxiliary transmission lines and optical transmitting units for transmitting the signal light by regenerative repeating; and
- optical amplifiers, arranged on both the operable transmission lines and the auxiliary transmission lines, for amplifying the signal light,
- wherein each of said optical transmitting units comprises dummy light output means, for outputting dummy light, and
- wherein said regenerative repeating node comprises:
  - input break identifying means for identifying an input break of the signal light input from the operable transmission lines or the auxiliary transmission lines; and
  - a clock control unit for controlling the switching of a clock so that the signal light is synchronized with a transmission line clock extracted from a main signal light when the signal light is identified as the main signal light and with a self-oscillating clock source when the signal light is identified as the dummy light.

17. The optical transmission system according to claim 16, wherein said optical transmission system having an optical surge suppression function further comprises:
- a center node for transmitting a plurality of signal light having different wavelengths to the operable transmission lines or the auxiliary transmission lines and receiving signal light from the operable transmission lines or the auxiliary transmission lines, and
- said optical demultiplexing/inserting means comprises:
  - a wavelength demultiplexing unit for extracting and demultiplexing signal light having a desired wavelength out of the wavelengths; and
  - a wavelength multiplexing unit for multiplexing the wavelength of signal light transmitted from said ADM node.

18. An optical transmission system having an optical surge suppression function according to claim 17, wherein said center node, said ADM nodes and said regenerative repeating node are interconnected by said transmission lines in the configuration of a ring.

19. An optical transmission system having an optical surge suppression function according to claim 17, wherein said dummy light output means outputs the dummy light as a false signal having a frequency different from the frequency of the transmission line clock.

20. An optical transmission system having an optical surge suppression function according to claim 17, wherein said dummy light output means outputs the dummy light as a continuous light.

* * * * *